D. G. WELLING.
TRANSMISSION GEAR.
APPLICATION FILED OCT. 16, 1908.

920,796.

Patented May 4, 1909.
2 SHEETS—SHEET 1.

Witnesses:
H. E. Chase
C. E. Clarke.

Inventor
D. G. Welling
By Howard Dinison
Atty

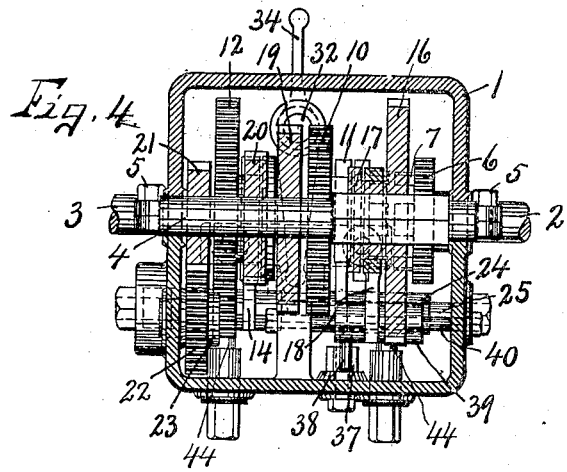
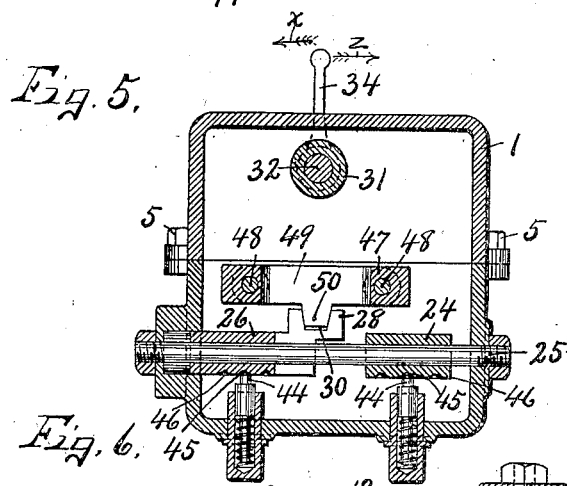
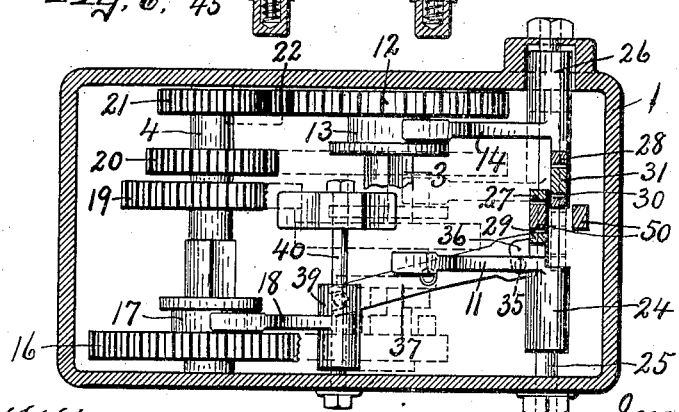

UNITED STATES PATENT OFFICE.

DANIEL G. WELLING, OF SYRACUSE, NEW YORK.

TRANSMISSION-GEAR.

No. 920,796.        Specification of Letters Patent.        Patented May 4, 1909.

Application filed October 16, 1908. Serial No. 458,110.

*To all whom it may concern:*

Be it known that I, DANIEL G. WELLING, of Syracuse, in the county of Onondaga, in the State of New York, have invented new and useful Improvements in Transmission-Gears, of which the following, taken in connection with the accompanying drawings, is a full, clear, and exact description.

This invention relates to certain improvements in transmission gears for self-propelled vehicles and refers more particularly to the sliding gear type for transmitting high, low or intermediate speeds or reverse drive from the engine to the running gear or traction wheels of the vehicle.

The primary object is to control the several movements of the gears through the medium of a single operating member.

Another object is to incorporate a clutch in the gear case with the transmission gears and to enable such clutch to be thrown into and out of connection with the driving shaft by the same operating member by which the sliding gears are controlled and at the same time to enable the driving shaft to operate free from or independently of the counter shaft and greater portion of the transmission gear thereby leaving the engine to run entirely free from the several gears by which low and intermediate speeds and reverse motion is produced and minimizing the noise and friction incidental to the operation of such gears.

Other objects and uses will be brought out in the following description.

Figure 1:
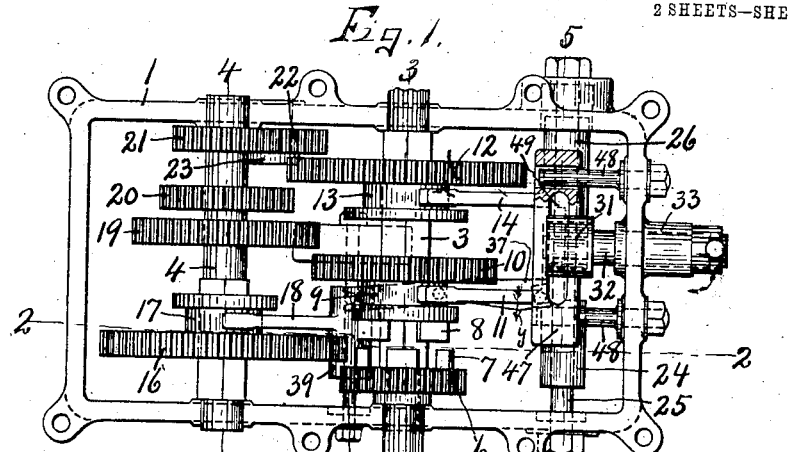
Figure 2:
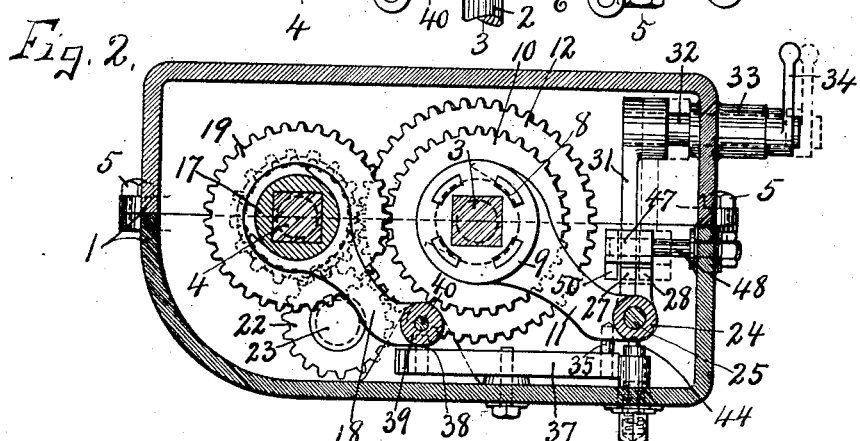

In the drawings—Figure 1 is a top plan partly in section of a transmission gear embodying the various features of my invention. Figs. 2, 3, 4 and 5 are sectional views taken respectively on lines 2—2, 3—3, 4—4 and 5—5, Fig. 1. Fig. 6 is a horizontal sectional view through the gear case showing particularly the shifting arms in top plan and also showing the sliding members for actuating two of the shifting arms in section, the operating lever also being shown in section at its junction with one of the sliding members, the driving gears for the high and intermediate speeds and also the clutch being broken away.

This transmission gear comprises essentially a gear case —1— preferably rectangular in top plan, coaxial driving sections —2— and —3— and a driven or counter shaft —4—.

The gear case is preferably divided horizontally in a plane coincident with the axis of the driving sections —2— and —3— and counter shaft —4—, thus permitting said shafts to be readily placed in operative position and held in place by the meeting edges of the gear case section and secured together by suitable fastening means as bolts —5—.

The driving shaft section —2— is preferably hollow and journaled in one side of the gear case —1— and extends to the exterior thereof where it may be connected directly or by any suitable connections to the crank shaft of the engine.

Secured to the inner end of the shaft section —2— is a driving gear —6— close to the adjacent side of the gear case —1— and provided on its inner face with a clutch section —7— which coöperates with a sliding clutch —8— for a purpose hereinafter described.

Figure 3:
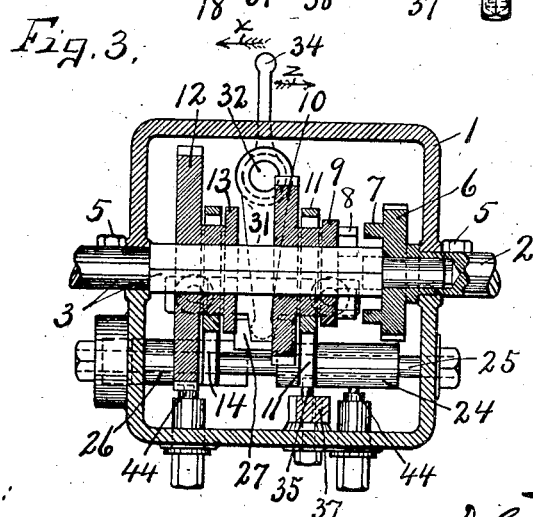

The driving shaft section —3— is angular in cross section throughout the greater portion of its length although its opposite ends are reduced and cylindrical, one reduced cylindrical end being journaled in the hollow driving shaft —2— while the opposite end is journaled in the opposite side of the gear case as best seen in Figs. 1 and 3.

The clutch section —8— is secured to one face of a grooved collar —9— which, in this instance, is formed integral with an intermediate speed gear —10—.

The clutch —8— together with the collar —9— and gear —10— are slidable axially on the angular portion of the shaft —3— by means of a shifting arm —11— which rides in the grooved collar —9— for throwing the clutch —8— into and out of operative connection with the main driving shaft clutch —7— so that when the clutch sections are in engagement with each other, the shaft section —3— which is extended outwardly beyond the adjacent side of the gear case and adapted to be connected to the traction wheels or running gear is driven directly from the engine or at high speed. A low speed reverse gear —12— having a grooved collar —13— is slidable axially upon the angular portion of the driving shaft —3— by means of a shifting arm —14—. These gears —10— and —12— and their grooved collars —9— and —13— are, therefore, rotatable with and slidable upon the angular portion of the shaft —3— but are movable axially independently of each other in a manner presently described.

The counter shaft —4— is also journaled in opposite sides of the case —1— parallel with the coaxial shaft sections —2— and —3— and is also provided with an angular portion upon which is slidable a gear —16— and grooved collar —17—, said gear and collar being rigidly connected and preferably formed integral with each other and are adapted to be shifted axially by a shifting arm —18— to throw the gear —16— into and out of mesh with the gear —6— on the main driving shaft section —2— so that when the gear —16— is in mesh with the gear —6— rotary motion will be transmitted from the shaft —2— to the counter shaft —4—.

Rigidly secured to the counter shaft —4— at suitable distances apart are an intermediate speed gear —19—, a low speed gear —20—, and a reverse driving gear —21—, the latter being in permanent mesh with an idler gear —22— which is journaled on a stud —23— projecting inwardly from the adjacent side of the gear case —1—.

The shifting arm —11— controls the high and intermediate speeds and also controls the action of the shifting arm —18— and for this purpose is rigidly secured to a hub —24— which is slidably mounted upon a guide rod —25—, the latter being secured to opposite sides of the gear case parallel with the axis of the driving shaft sections —2— and —3—.

The shifting arm —14— controls the low speed and reverse drive and is rigidly secured to a hub —26— which is also slidably mounted upon the guide rod —25— at one end of the hub —24—.

The adjacent ends of the hubs —25— and —26— are cut away to allow such ends to slide by each other and the overlapping ends are provided with upwardly projecting forked arms —27— and —28— respectively thereby forming recesses or open sided slots —29— and —30— adapted to be brought into registration with each other when the coacting gears on the driving and counter shafts are out of mesh with each other and the clutch —8— is out of engagement with the clutch —7— or in other words when the main driving shaft section —3— is free from action with other parts of the transmission gear. These recesses or slots —29— and —30— are adapted to receive one end of a rock arm or lever —31— which is secured to the inner end of the rock shaft —32—, the latter being journaled in suitable bearings —33— in one end of the gear case and is provided at one end with an operating member —34— whereby the shaft —32— may be rocked to oscillate the arm —31— in the slot of the forked arm with which it may be interlocked for the purpose of shifting the corresponding sliding hub and also the part connected thereto. For example, in Figs. 1 to 5 inclusive I have shown the free end of the rock arm —31— as interlocked with the forked arm of the sliding member —24— for shifting the clutch —8— into and out of operative connection with the clutch —7— for high speed drive or free engine or for shifting the gear —10— into mesh with the corresponding gear —19— for intermediate speed drive. For example, upon reference to Fig. 3, the gears on the driving shaft sections —2— and —3— are all out of mesh with corresponding gears on the counter shaft —4— and the clutch —8— is also out of mesh leaving a free engine which drives only the gear —6—.

Now if it is desired to drive the machine under high speed the lever —34— is rocked in the direction indicated by arrow —X— thereby rocking the arm —31— and shifting the corresponding arm —11— in the opposite direction or in the direction indicated by arrow —Y—, Fig. 1 until the clutch —8— is thrown into engagement with the clutch section —7— and at the same time shifting the intermediate speed gear —10— further away from its corresponding gear —19—, it being understood that the distance between the gears —16— and —19— is sufficient to allow the clutch —8— to be thrown into and out of operative connection with the clutch —7— without throwing the gear —10— into mesh with its corresponding gear —19—.

When the clutch —8— is in operative connection with the clutch —7— in the manner just described, the shaft section —3— with the gears —10— and —12— thereon are driven at high speed or normal speed of the engine.

Secured to the under side of the shifting arm —11— is a stud —35— which plays in a slot —36— in one end of a centrally pivoted lever —37—, the opposite end of said lever being also forked for receiving a pin —38— on the lower side of a hub —39— of the shifting arm —18—, said hub —39— being slidable lengthwise of a guide rod —40— which is secured in the base of the gear case as best shown in Fig. 6.

The slot —36— is just wide enough to permit the movement of the clutch —8— into and out of connection with the clutch —7— without effecting the operation of the lever —37— and corresponding shift arm —18— but as soon as the clutch —8— is thrown out of engagement with the clutch —7— by the movement of the lever —34— in the direction indicated by arrow —Z—, Fig. 3, the stud —35— encounters the opposite side of the slot —36— and by the continued movement of the operating member —34— in the direction indicated by arrow —Z— thereby further shifting the member —24—, the stud —35— engages and operates the lever —37— and thereby causes the opposite end of the lever —37— to engage the stud —38— and shift the arm —18— and gear —16— to bring the latter into mesh with the gear —6— and at the same time the shifting arm —11— is operated to shift the gear —10— into mesh with its intermediate speed gear —19— whereupon rotary motion is imparted from the gear —6—, to the gear —16—, and thence through the counter shaft to the intermeshing gears —19— and —10— for imparting intermediate speed to the shaft section —3— and thence to the running gear or traction wheels of the vehicle. Now by rocking the operating member —34— back half-way in the direction indicated by arrow —X—, the gear —10— will be thrown out of mesh with its corresponding gear —19— leaving the gear —16— in mesh with the pinion —6— because the width of the slot —36— in the forked end of the lever —37— permits of this adjustment without effecting the operation of the lever —37— or shift arm —18—. When in this position the slots in the forks —27— and —28— are registered with each other which permits the rock-shaft —32— and rock arm —31— to be moved by the lever —34— axially until the lower end of the rocking arm —31— is brought into engagement with the forked arm —28— for low speed or reverse drive.

When the rock arm —31— is engaged with the forked arm —28— of the shifting member —14— it is thrown out of connection with the lever —37— and thus cannot effect any shifting movement of the gear —16— which remains in mesh with the pinion —6—.

When the slots in the forked arms —27— and —28— are registered with each other the gear —12— extends substantially midway between the adjacent faces of the gears —20— and —21— without being in mesh with either of them but by rocking the operating member or lever —34— in the direction indicated by arrow —X— the shifting member —14— will be similarly operated to throw the gear —12— into mesh with the slow speed gear —20— and by reverse operation of the lever —34— the same gear —12— will be thrown into mesh with the idler gear —22— which is in constant mesh with the reverse drive gear —21—.

When the slots in the forked arms —27— and —28— are registered with each other and the rock arm —31— is engaged with the slide —27—, said rock arm and its operating member and also all of the other parts of the transmission gear may be said to be in their normal or starting positions, that is the engine is free and the coacting gears and clutch sections are out of mesh, in which position the shifting members —24— and —26— are frictionally held against accidental displacement or movement by spring actuated detents —44— which engage in suitable notches —45— in the under sides of the members —24— and —26—, said members being provided with similar notches —46— for receiving the corresponding detents —44— and holding the members —24— and —26— in either of their adjusted positions for high, low or intermediate speeds and for reverse drive.

As a further protection against accidental shifting of either one of the shifting levers —11— or —14— when the other one is in operative connection with the rock arm —31—, the rock arm —31— is passed through an elongated slot in a sliding bar —47— which is guided on fixed rods —48— as best seen in Fig. 5, the slot being of substantially the same tranverse width as the thickness of the rock arm —31— but is sufficiently long to allow the rocking movement of said rock arm in shifting either of the members —24— or —26—. This sliding bar —47— is provided at opposite sides of its slot as —49— with pendent lugs or ears —50— of substantially the same form as the slots —30— in the shifting members —24— and —26— into which said lugs or ears are adapted to ride alternately as the rock arm —31— is shifted lengthwise. That is, when the slots in the forked arms —27— and —28— are registered with each other and the rock arm —31— shifted to engage in the forked arm —27—, the opposite lug —50— engages in the slot —30— of the forked arm —28— and if the rock arm —31— is shifted to engage in the forked arm —28— the opposite lug —50— will interlock with the forked arm —27— and in as much as the bar —47— has no longitudinal movement, it is evident that when either of the lugs —50— is engaged with its corresponding forked arm —27— or —28— the corresponding shift arm —11— or —14— will be held against shifting movement while the other one will be free to shift by the action of the rock arm —31—.

What I claim is:

1. In a transmission gearing for self-propelled vehicles, two separately movable shifting members, a single operating member movable into and out of engagement with either of said members and having an independent movement for operating the shifting member with which it may be connected, an additional shifting member, and means actuated by the movement of one of the first named shifting members in one direction for moving the last named shifting member in the opposite direction.

2. In a transmission gearing for self-propelled vehicles, two separately movable shifting members, a rock arm movable into and out of engagement with either of said members and adapted to operate by its rocking movement the shifting member with which it may be engaged, an additional shifting member, and means actuated by the movement of one of the first named shifting members in one direction for moving the last named shifting member in the opposite direction.

3. In a transmission gearing for self-propelled vehicles, two separately movable shifting members, a single operating member movable into and out of engagement with either of said members and having an independent movement for operating the shifting member with which it may be connected, means for locking the shifting member not engaged by the operating member, an additional shifting member, and means actuated by the movement of one of the first named shifting members in one direction for moving the last named shifting member in the opposite direction.

4. In a transmission gearing for self-propelled vehicles, two separately movable shifting members, a rock arm movable into and out of engagement with either of said members and adapted to operate by its rocking movement the shifting member with which it may be engaged, means actuated by the axial shifting of the rocking member for locking the shifting member not engaged by the rocking member, an additional shifting member, and means actuated by the movement of one of the first named shifting members in one direction for moving the last named shifting member in the opposite direction.

5. In a transmission gearing for self-propelled vehicles, two coaxial separately rotatable shaft sections, one of which is the driving medium, a sliding clutch on one of the coaxial shaft sections movable into and out of connection with the other shaft section for transmitting rotary motion from the driving section to the other section, a driving gear on the driving section, a sliding shifting member for the clutch, a manually controlled rock arm for operating said shifting member, a counter shaft, a gear on the counter shaft movable into and out of mesh with the driving gear, a sliding shifting member for the counter-shaft gear, and a lever actuated by the first named shifting member and transmitting motion therefrom to the second shifting member.

6. In a transmission gearing for self-propelled vehicles, coaxial driving and driven shafts, the driving shaft being movable independently of the driven shaft, a sliding clutch on the driven shaft movable into and out of operative connection with the driving shaft, a sliding shifting member for said clutch, a sliding gear movable with said clutch on the driven shaft and also actuated by said shifting member, a rock arm for operating the shifting member, a pinion on the driving shaft, a counter shaft, a sliding gear on the counter shaft movable into and out of mesh with the pinion, a shifting member for the sliding gear on the counter shaft, means actuated by the first named shifting member when moved in one direction to shift the second shifting member in the opposite direction, and an additional gear rigid on the counter shaft and adapted to be engaged by the gear on the driven shaft when the gear on the counter shaft is thrown into mesh with the pinion.

7. In a transmission gearing for self-propelled vehicles, coaxial driving and driven shafts, the driving shaft being rotatable independently of the driven shaft, a countershaft, a gear on the countershaft, a sliding clutch on the driven shaft movable into and out of connection with the driving shaft, a shifting member for said clutch, a sliding gear on the driven shaft separate from the clutch and movable into and out of mesh with the countershaft gear, a separate shifting member for the sliding gear, and a rock arm movable axially into and out of connection with the shifting members and adapted to operate by its rocking movement the shifting member with which it is operatively connected.

8. In a transmission gearing for self-propelled vehicles, coaxial driving and driven shafts, the driving shaft being rotatable independently of the driven shaft, a countershaft, a gear on the countershaft, a sliding clutch on the driven shaft movable into and out of connection with the driving shaft, a shifting member for said clutch, a sliding gear on the driven shaft separate from the clutch and movable into and out of mesh with the countershaft gear, a separate shifting member for the sliding gear, a rock arm movable axially into and out of connection with the shifting members and adapted to operate by its rocking movement the shifting member with which it is operatively connected, and means for holding the other shifting member not in engagement with the rock arm against shifting movement.

9. In a transmission gearing for self-propelled vehicles, coaxial driving and driven shafts, the driving shaft being rotatable independently of the driven shaft, a sliding clutch on the driven shaft movable into and out of connection with the driving shaft, a shifting member for said clutch, a sliding gear on the driven shaft separate from the clutch, a separate shifting member for the sliding gear, a rock arm movable axially into and out of connection with the shifting members and adapted to operate by its rocking movement the shifting member with which it is operatively connected, a pinion on the driving shaft, a counter shaft, a sliding gear on the counter shaft movable into and out of mesh with the pinion, a shifting member for the sliding gear on the counter shaft, and means actuated by one of the first named shifting members when moved in one direction for moving the last named shifting member in the opposite direction.

10. In a transmission gearing for self-propelled vehicles, coaxially driving and driven shafts, the driving shaft being rotatable independently of the driven shaft, a pinion on the driving shaft, a clutch slidable on the driven shaft into and out of connection with the pinion, an intermediate speed gear movable with the clutch, a shifting member for said clutch and intermediate speed gear, a low speed and reverse gear slidable on the driven shaft independently of the clutch and intermediate speed gear, a separate shifting member for the low speed and reverse gear, a rocking member having an independent rocking movement into and out of engagement with either of said shifting members and adapted to operate by its rocking movement the one with which it is engaged, a counter shaft, a sliding gear on the counter shaft movable into and out of mesh with the driving pinion, a shifting member for the sliding gear on the counter shaft, intermediate and low speed gears rigid on the counter shaft, the intermediate gear being adapted to be engaged by the shifting of the intermediate gear on the driven shaft, a reverse drive gear rigid on the counter shaft, an idler meshing with the reverse drive gear on the counter shaft, said low speed and reverse gear on the driven shaft being movable into and out of engagement with the low speed gear on the counter shaft and idler, and means actuated by one of the first named shifting members for moving the shifting member for the sliding gear on the counter shaft.

In witness whereof I have hereunto set my hand this 26th day of September, 1908.

DANIEL G. WELLING.

Witnesses:
H. E. CHASE,
C. M. McCORMACK.